US011226891B2

(12) United States Patent
Han et al.

(10) Patent No.: US 11,226,891 B2
(45) Date of Patent: Jan. 18, 2022

(54) TESTING DEVICES AND METHODS FOR TESTING A DEVICE DRIVER SOFTWARE

(71) Applicant: RAZER (ASIA-PACIFIC) PTE. LTD., Singapore (SG)

(72) Inventors: Xu Han, Guangdong (CN); Wenliang Yang, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/606,736

(22) PCT Filed: Apr. 21, 2017

(86) PCT No.: PCT/SG2017/050224
§ 371 (c)(1),
(2) Date: Oct. 18, 2019

(87) PCT Pub. No.: WO2018/194512
PCT Pub. Date: Oct. 25, 2018

(65) Prior Publication Data
US 2020/0065236 A1 Feb. 27, 2020

(51) Int. Cl.
*G06F 11/36* (2006.01)
*G06F 9/455* (2018.01)
(52) U.S. Cl.
CPC .......... *G06F 11/3688* (2013.01); *G06F 9/455* (2013.01); *G06F 11/3664* (2013.01); *G06F 11/3684* (2013.01); *G06F 11/3692* (2013.01)
(58) Field of Classification Search
CPC .. G06F 9/455; G06F 11/3664; G06F 11/3684; G06F 11/3688; G06F 11/3692
(Continued)

(56) References Cited

U.S. PATENT DOCUMENTS 6,496,891 B1   12/2002   Cluff et al.
6,636,929 B1   10/2003   Frantz et al.
(Continued)

OTHER PUBLICATIONS

D. Eschweiler and V. Lindenstruth, "Test driven development for device drivers and rapid hardware prototyping," 2015 IEEE Eighth International Conference on Software Testing, Verification and Validation Workshops (ICSTW), 2015, pp. 1-9, doi: 10.1109/ICSTW.2015.7107425. (Year: 2015).*
(Continued)

*Primary Examiner* — Andrew M. Lyons
(74) *Attorney, Agent, or Firm* — Polsinelli PC

(57) ABSTRACT

According to various embodiments, there is provided a method for testing a device driver software of a processor, the method including: configuring an identity field of a testing device based on a device emulation command received through a first testing device interface, wherein the identity field is accessible by the device driver software for recognising the testing device; running an emulation program on the testing device, the emulation program including an emulation of a human input device in accordance with the configured identity field; receiving an input instruction in the testing device via the first testing device interface, the input instruction indicative of an input performable on the emulated human input device; the emulation program, emulating an output signal generatable by the emulated human input device in response to the input being performed on the emulated human input device; outputting the emulated output signal via a second testing device interface to the device driver software of the processor to translate the emulated output signal to an event in an application program running on the processor.

12 Claims, 6 Drawing Sheets

(58) Field of Classification Search
USPC .......................................................... 717/124
See application file for complete search history.

(56) References Cited

U.S. PATENT DOCUMENTS

| | | | | |
|---|---|---|---|---|
| 7,010,782 | B2* | 3/2006 | Narayan | ................. H04L 41/22 |
| | | | | 702/118 |
| 7,082,598 | B1* | 7/2006 | Le | ......................... G06F 9/4411 |
| | | | | 703/21 |
| 7,162,407 | B2 | 1/2007 | Poley et al. | |
| 7,752,029 | B2* | 7/2010 | Tamayo | ................. G06F 16/116 |
| | | | | 703/24 |
| 8,401,588 | B2 | 3/2013 | Hameed et al. | |
| 8,533,531 | B2* | 9/2013 | El Mahdy | ............. G06F 11/261 |
| | | | | 714/28 |
| 9,009,359 | B2 | 4/2015 | Ashok et al. | |
| 9,009,374 | B2 | 4/2015 | Hulbert et al. | |
| 10,521,365 | B2* | 12/2019 | Bshara | .................. G06F 9/5077 |
| 2002/0087285 | A1 | 7/2002 | Chew | |
| 2006/0069453 | A1* | 3/2006 | DeBourke | ................ E03C 1/041 |
| | | | | 700/19 |
| 2006/0069543 | A1 | 3/2006 | Sajwani et al. | |
| 2007/0299650 | A1* | 12/2007 | Tamayo | ................. G06F 13/105 |
| | | | | 703/27 |
| 2008/0021693 | A1* | 1/2008 | Campbell | ............. G06F 11/261 |
| | | | | 703/21 |
| 2008/0120603 | A1 | 5/2008 | Chace | |
| 2008/0216007 | A1* | 9/2008 | Brockbank | ........ G01R 31/2844 |
| | | | | 715/771 |
| 2010/0033425 | A1 | 2/2010 | Shasek et al. | |
| 2011/0179204 | A1 | 7/2011 | Hulbert et al. | |
| 2013/0030786 | A1* | 1/2013 | Halim | ..................... G06F 9/455 |
| | | | | 703/24 |
| 2013/0219222 | A1 | 8/2013 | Xue et al. | |
| 2014/0005974 | A1 | 1/2014 | Vyas et al. | |
| 2015/0261696 | A1* | 9/2015 | Christian | .............. G06F 13/105 |
| | | | | 703/25 |
| 2016/0283353 | A1 | 9/2016 | Owen et al. | |
| 2018/0157839 | A1* | 6/2018 | Pearson | .................. H04L 9/083 |
| 2019/0217193 | A1* | 7/2019 | Wells | ..................... G06F 9/4411 |

OTHER PUBLICATIONS

International Search Report and Written Opinion, dated Dec. 29, 2017, for the corresponding International Application No. PCT/SG2017/050224 in 7 pages.

Lund, M.E., et al. A Framework for Mouse and Keyboard Emulation in a Tongue Control System. In 2009 Annual International Conference of the IEEE Engineering in Medicine and Biology Society, pp. 815-818. IEEE.

Caltenco, H.A., et al. TongueWise: Tongue-computer interface software for people with tetraplegia. In 2010 Annual International Conference of the IEEE Engineering in Medicine and Biology, pp. 4534-4537. Abstract. IEEE.

Extended European Search Report dated Mar. 31, 2020, 8 pages, for the corresponding European Patent Application No. 17906518.0.

* cited by examiner

TESTING DEVICES AND METHODS FOR TESTING A DEVICE DRIVER SOFTWARE

TECHNICAL FIELD

Various embodiments relate to testing devices and methods for testing a device driver software.

BACKGROUND

Human input devices (HID) such as keyboards and computer mice may be used to provide user inputs to a computing device. For example, a user may type on the keys of a keyboard to activate functions in an application running on the computing device. The HID may send an output signal to the computing device based on the user input performed on the HID. A device driver software of the computing device may translate the output signal into an event in the application, to activate functions in the application. The device driver software may be configured to support more than one type of HID, for example, it may be capable of translating the output signals of several keyboard models and several computer mouse models. Typically, testing the device driver software may include coupling the supported HIDs to the computing device, one device at a time, followed by providing a series of user inputs on the coupled HID, and then observing the events that are activated in the application as a result of each user input.

SUMMARY

According to various embodiments, there may be provided a method for testing a device driver software of a processor, the method including: configuring an identity field of a testing device based on a device emulation command received through a first testing device interface, wherein the identity field is accessible by the device driver software for recognising the testing device; running an emulation program on the testing device, the emulation program including an emulation of a human input device in accordance with the configured identity field; receiving an input instruction in the testing device via the first testing device interface, the input instruction indicative of an input performable on the emulated human input device; the emulation program, emulating an output signal generatable by the emulated human input device in response to the input being performed on the emulated human input device; outputting the emulated output signal via a second testing device interface to the device driver software of the processor to translate the emulated output signal to an event in an application program running on the processor.

According to various embodiments, there may be provided a testing device including: an identity field accessible by a device driver software of a processor for recognising the testing device; a first testing device interface configured to receive a device emulation command, wherein the identity field is configurable based on the device emulation command; an emulation program including an emulation of a human input device in accordance with the configured identity field; wherein the first testing device interface is further configured to receive an input instruction indicative of an input performable on the emulated human input device; wherein the emulation program is further configured to emulate an output signal generatable by the emulated human input device in response to the input being performed on the emulated human input device; a second testing device interface configured to output the emulated output signal to the device driver software to translate the emulated output signal to an event in an application program running on the processor.

According to various embodiments, there may be provided a non-transient computer-readable medium having stored therein instructions which, when executed by a processor, causes the processor to perform a method for testing a device driver software, the method including: configuring an identity field of a testing device by sending a device emulation command to the testing device through a first testing device interface, the identity field being readable by the device driver software for recognising the testing device; initiating an emulation program on the testing device, the emulation program including an emulation of a human input device in accordance with the configured identity field; sending an input instruction to the testing device via the first testing device interface, the input instruction indicative of an input performable on the emulated human input device; wherein the emulation program is configured to emulate an output signal generatable by the emulated human input device in response to the input being performed on the emulated human input device; and wherein a second testing device interface is configured to output the emulated output signal to a device driver software of a further processor to translate the emulated output signal to an event in an application program running on the further processor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
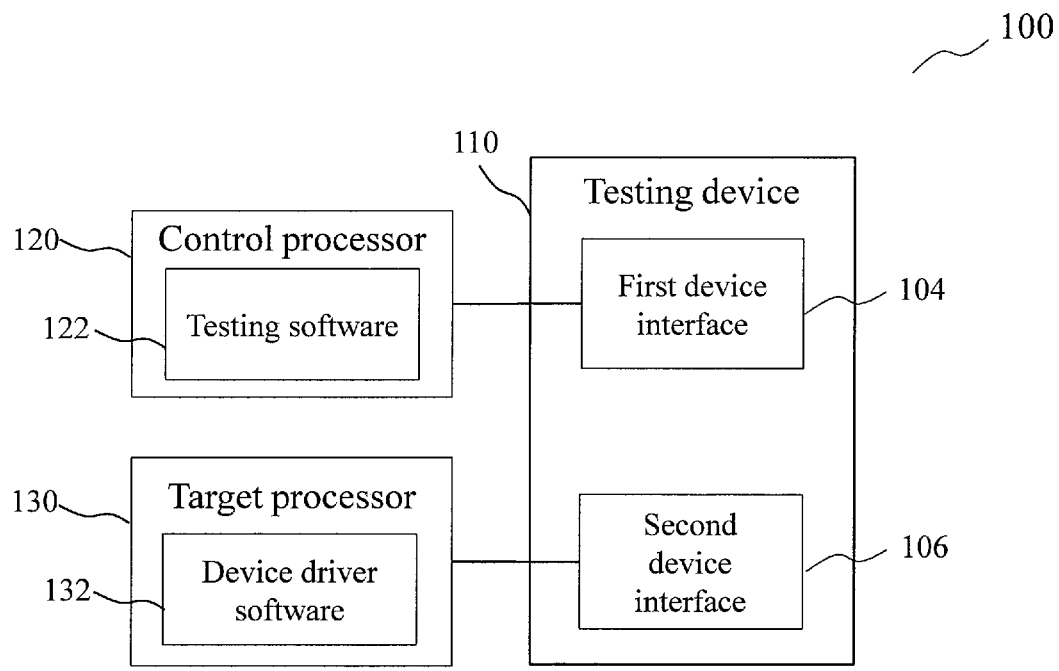
FIG. 1 shows a schematic diagram of a test setup implementing a method for testing a device driver software according to various embodiments.

Embodiments described below in context of the devices are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

In this context, the device as described in this description may include a memory which is for example used in the processing carried out in the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "controller" may be understood as any kind of a logic implementing entity, which may be special purpose circuitry or a processor executing software stored in a memory, firmware, or any combination thereof. Thus, in an embodiment, a "controller" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "controller" may also be a processor executing software, e.g. any kind of computer program, e.g. a computer program using a virtual machine code such as e.g. Java. Any other kind of implementation of the respective functions which will be described in more detail below may also be understood as a "controller" in accordance with an alternative embodiment.

In the specification, the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as communicatively coupled, electrically coupled or as mechanically coupled, for example attached or fixed, or just in contact without any fixation, and it will be understood that both direct coupling or indirect coupling (in other words: coupling without direct contact) may be provided.

The reference to any conventional devices in this specification is not, and should not be taken as an acknowledgement or any form of suggestion that the referenced conventional devices form part of the common general knowledge in Australia (or any other country).

In order that the invention may be readily understood and put into practical effect, various embodiments will now be described by way of examples and not limitations, and with reference to the figures.

In the context of various embodiments, the word "processor" may refer to a processor of a computing device, for example, a central processing unit of a personal computer, or to any kind of logic or circuit.

In the context of various embodiments, the phrase "device driver software" may be but is not limited to being interchangeably referred to as a "device driver" or a "driver".

In the context of various embodiments, the word "tester" may refer to a person who is testing a device driver software.

According to various embodiments, a device driver software may be configured to translate messages from any processor into messages that are readable by any hardware device that is supported by (in other words: compatible with) the device driver software. The messages may be generated by the operating system of the processor or an application running on the processor. The device driver software may be further configured to translate messages from any compatible hardware device into messages that are readable by the processor. The processor may read the messages using the operating system or an application running on the processor. In other words, the device driver software may serve as a translator between any compatible hardware device and the processor. The device driver software may also be configured to operate under a "key assignment" mode in support of a compatible hardware device that is a human input device (HID). Under the "key assignment" mode, the device driver software may be configured to assign user inputs performable on the compatible HID to respective output signals that are may trigger respective events in an application. For example, the compatible HID may be a keyboard or a computer mouse or the like. The user inputs performable on the keyboard may include the pressing of any key of the keyboard. Each key of the keyboard may be mapped to a respective output signal. The mapping may be controlled by a firmware of the keyboard. For example, under a normal mode of operation, when a key 'A' is pressed, the keyboard may be configured to generate an output signal carrying the message 'A'. The device driver software may receive the output signal from the HID and may instruct an application, for example a typing application, to activate an event of displaying 'A'. Under the "key assignment" mode, the device driver software may be configured to assign the output signal generatable by at least one key of the keyboard to activate an event as if the output signal is generated by another key of the keyboard. A user may define the assignment in the device driver software. For example, the device driver software may be configured to assign the output signal generatable in response to a key 'A', to an event corresponding to the output signal generatable by key 'B'. In this example, when a user presses the key 'B' on the keyboard, the device driver software receives the output signal corresponding to the key 'B' and then translates the output signal into an event corresponding to key 'A'. The device driver software may provide the event to an application or the operation system. The device driver software may also be configured to operate under a "macro assignment" mode in support of the compatible HID. Under the "macro assignment" mode, the device driver software may be configured to assign the output signal generatable by a key to activate a sequence of events as if a predetermined sequence of keys is pressed. For example, the device driver software may assign the output signal generatable by key 'A' to the sequence of displaying 'h', 'e', 'l', 'l' and 'o'. In this example, when the user presses key 'A' on the keyboard, the device driver software may activate a sequence of events for displaying 'hello' on the application, as if the user had typed "hello". To manually test the device driver software, for example, functionality of the "key assignment" mode, a tester typically has to assign a key to an event using the device driver software, connect the HID to the processor, press the assigned key and check whether the key is correctly assigned to activate the expected event in an application such as a text input application. The tester may need to test all the keys on a keyboard, when testing the device driver software. Assuming an average key count of 104 on one keyboard, on average, the test may spend about one and a half hours on testing the device driver software with respect to one keyboard. Moreover, if the device driver software is configured to support a wide range of keyboards, the amount of time required for testing the device driver software may be multiplied according to the number of supported (in other words: compatible) keyboards. It may be understood that the HID may be any other types of HID such as computer mice, joysticks or game controllers. Accordingly, the functions of the device driver software with respect to keys of a keyboard may also be analogously applicable to other user input components of any other types of HID, such as buttons, scroll wheels or joystick handles.

A method for testing a device driver software according to various embodiments, may reduce the time required for testing the device driver software. The method may include emulating a plurality of HIDs. In other words, instead of physically connect the plurality of HIDs sequentially to a processor that is running the device driver software, emulation programs may provide emulated output signals of the plurality of HIDs to the device driver software. The method may also include automating the test procedure using a testing software. In other words, at least one process of assigning a key to an event, pressing the assigned key or checking whether the key is correctly assigned to activate the expected event in an application, may be performed by the testing software. The testing software may be a script or a computer program that may be run on a processor. By emulating the HID and automating the test procedure, the time taken to test the device driver software with respect to a keyboard may be reduced to only about 15 minutes. The device driver software may be run on a different processor that is distinct from the processor that runs the testing software. Alternatively, a single processor may run both the device driver software and the testing software.

FIG. 1 shows a schematic diagram of a test setup 100 implementing a method for testing a device driver software 132 according to various embodiments. The method may be performed to test the device compatibility of the device driver software 132 with respect to a range of HIDs. The test setup 100 may include a testing device 110, a control processor 120 and a target processor 130. The testing device 110 may be a computer peripheral device that is configured to be connectable to any processor. For example, the testing device 110 may be a flash disk or a HID like a computer mouse. The testing device 110 may include a first device interface 104 and may further include a second device interface 106. Each of the control processor 120 and the target processor 130 may be a computing device, for example a personal computer or a laptop. The control processor 120 may include a testing software 122. The control processor 120 may be configured to run the testing software 122. The target processor 130 may include the device driver software 132. The target processor 130 may be configured to run the device driver software 132.

The first device interface 104 may be configured to communicatively couple the testing device 110 to the control processor 120. In other words, the testing device 110 may be configured to at least one of receive data from, or transmit data to the control processor 120 through the first device interface 104. The second device interface 106 may be configured to communicatively couple the testing device 110 to the target processor 130. In other words, the testing device 110 may be configured to at least one of receive data from or transmit data to the target processor 130 through the second device interface 106. At least one of the first device interface 104 or the second device interface 106 may include a data bus connector, such as a Universal Serial Bus (USB) connector, an IEEE 1394 connector, a parallel connector, a serial connector or a PS/2 connector. The data bus connector may be a plug, in other words, a male connector. The data bus connector may be configured to couple with a corresponding receptacle, in other words, a corresponding female connector. The control processor 120 may include a receptacle that corresponds to the first device interface 104. The target processor 130 may include a receptacle that corresponds to the second device interface 106. Each of the first device interface 104 and the second device interface 106 may further include a communication protocol, for at least one of packaging data that is to transmitted or interpreting data that is received through the data bus connector. At least one of the first device interface 104 or the second device interface 106 may also include a data carrier connected between the respective data bus connector and a controller of the testing device 110. The data carrier may be a wire such as a cable or a cord. The data carrier may also be a wireless transceiver, for example an infra-red transceiver, a Bluetooth transceiver or a Wi-Fi transceiver.

A tester may use the control processor 120 to control the process of testing the device driver software 132. The tester may enter testing parameters into the testing software 122 for controlling the testing process. For example, the tester may select a HID model such as the Razer Deathstalker keyboard, in the testing software 122. The testing software 122 may provide a device emulation command to the testing device 110 through the first device interface 104, based on the tester's selection. The testing device 110 may emulate the Razer Deathstalker keyboard in response to the device emulation command. The tester may also select a user input to be emulated on the emulated HID. For example, the test may select "spacebar" in the testing software 122. The testing software 122 may provide an input instruction indicative of the "spacebar" being pressed on the emulated HID, such as the Razer Deathstalker keyboard. The testing software 122 may provide the input instruction to the testing device 110 through the first device interface 104.

According to various embodiments, a single processor may be configured to perform the functions of the control processor 120 and the target processor 130. The single processor may include the device driver software 132 and the testing software 122. The testing device 110 may include only a single device interface which may be one of the first device interface 104 or the second device interface 106. The testing device 110 may be configured to receive data from, or transmit data to, the single processor through the single device interface.

According to various embodiments, the control processor 120 may be a remote server, for example, a server hosted on a computing cloud. The testing device 110 may be configured to communicate with the control processor 120 through the first device interface 104 and further through a network such as the internet or a local area network.

Figure 2:
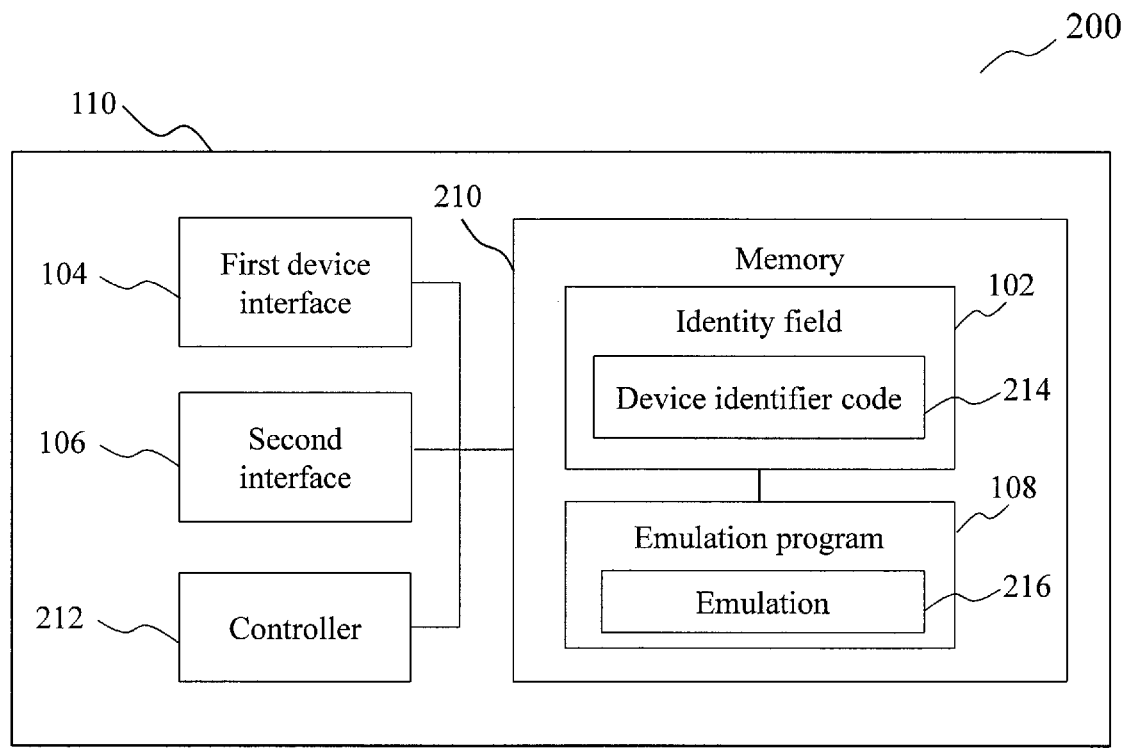
FIG. 2 shows a schematic diagram of a testing device according to various embodiments.

FIG. 2 shows a schematic diagram 200 of the testing device 110 according to various embodiments. In addition to the first device interface 104 and the second device interface 106, the testing device 110 may further include a memory 210. The memory 210 may be configured to store data. The memory 210 may be a random-access memory such as a non-volatile random-access memory, a dynamic random-access memory or a static random-access memory, or a direct-access memory. The memory 210 may be re-programmable. The testing device 110 may further include a controller 212. The controller 212 may be configured to control at least one of the first device interface 104, the second device interface 106 or the memory 210. The memory 210 may store an identity field 102. The identity field 102 may be a re-writable data field. The identity field 102 may be configured to store a device identifier code 214. The identity field 102 may be accessed by any computing device, for example the target processor 130. The device identifier code 214 may be readable by any computing device, for example the target processor 130. When the testing device 110 is connected to the target processor 130, the target processor 130 may access the identity field 102 to read the device identifier code 214. The device identifier code 214 may include information on a particular HID model. For example, the device identifier code 214 may include the product identity and vendor identity (PID/VID) of a particular computer mouse model. The target processor 130 may recognize the testing device 110 based on the device identifier code 214. The testing device 110 may be recognized by the target processor 130 as being the particular computer mouse model, based on the device identifier code 214. The testing device 110 may be configured to receive a device emulation command from the control processor 120 through the first device interface 104. The controller 212 may be configured to alter the device identifier code 214 in the identity field 102 based on information in the device emulation command. The memory 210 may further store an emulation program 108. The emulation program 108 may be configured, when performed by the target processor 130, to emulate a HID corresponding to the device identifier code 214. The emulation program 108 may include an emulation 216 of the HID identified by the device identifier code 214. For example, the device identifier code 214 may indicate the identity of a Razer Black Widow Chroma keyboard. The emulation 216 may be an emulation of the Razer Black Widow Chroma keyboard. The emulation program 108 may be configured to emulate the behaviour of the identified HID, including how the HID reacts to user inputs. The memory 210 may store more emulation programs 108. Each emulation program 108 may include an emulation 216 of a respective HID. The controller 212 may be configured to select one emulation program 108 from the plurality of emulation programs 108, that matches the device identifier code 214.

Figure 3:
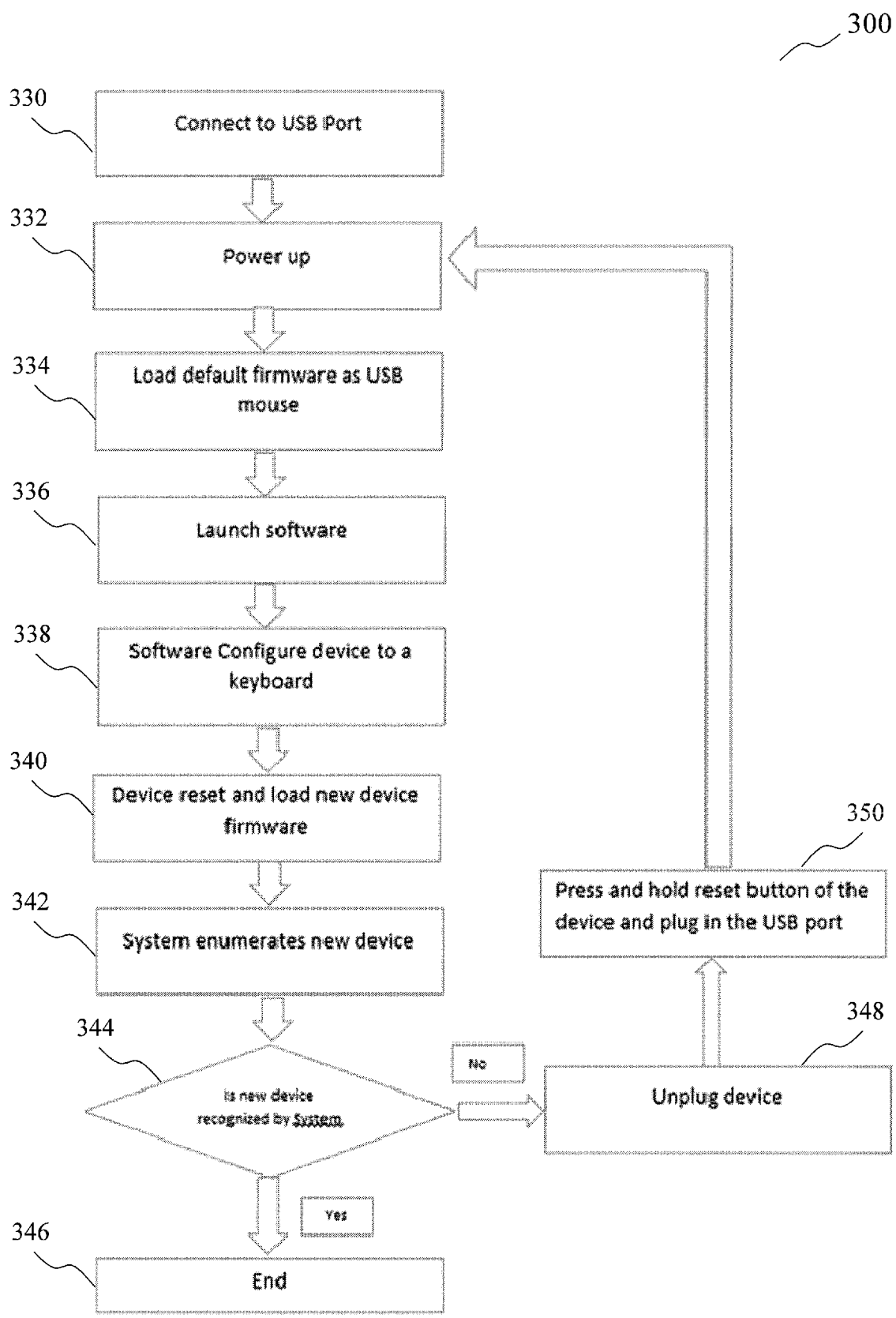
FIG. 3 shows a flow diagram of one cycle of a device emulation process using a testing device according to various embodiments.

FIG. 3 shows a flow diagram of one cycle of a device emulation process 300 using a testing device according to various embodiments. The device emulation process 300 may be part of the method for testing a device driver software of a processor. The device driver software may be the device driver software 132. The device driver software 132 may be run on the target processor 130. The testing device may be the testing device 110. As an illustrative, non-limiting example, the flow diagram shows that the testing device 110 is a computer mouse. In this example, the first device interface 104 and the second device interface 106 include USB connectors. The device emulation process 300 may include a plurality of sub-processes. In sub-process 330, the testing device 110 may be connected to the receptacle of the target processor 130 through the second device interface 106. The receptacle may be a USB port that may be coupled to the USB connector. In 332, the testing device 110 may be powered up. The testing device 110 may receive electrical power from the target processor 130 through the second device interface 106. Alternatively, the testing device 110 may receive electrical power from a power source such as a battery. In 334, the target processor 130 may recognize the testing device 110 and thereby load the default firmware of the testing device 110. In other words, the target processor 130 may recognize the true identity of the testing device 110 and then load a firmware based on the recognized identity. The target processor 130 may include an operating system that may be configured to perform the recognition process. In this example, the testing device 110 is a computer mouse and therefore, the target processor 130 loads the firmware of the computer mouse. In 336, the testing software 122 may be launched on the control processor 120. In 338, the testing software 122 may configure the identity field 102 of the testing device 110 to reflect a new identity. The new identity may be a HID. The testing software 122 may configure the identity field 102 by providing a device emulation command to the testing device 110. The device emulation command may include a device identifier code 214 of the HID. In this example, the HID may be a keyboard. The testing software 122 may configure the identity field 102 by writing to the identity field 102 with the device identifier code 214. Alternatively, the testing software 122 may configure the identity field 102 by selecting one device identifier code 214 from a plurality of device identifier codes 214 stored in the memory 210 of the testing device 110. The device identifier code 214 may contain information on the HID. The testing software 122 may configure the identity field 102 by writing over the existing device identifier code, also referred herein as the default device identifier code, i.e. the device identifier code containing information on the true identity of the testing device 110. In this example, the testing software 122 may overwrite the device identifier code of the computer mouse with the device identifier code of the keyboard. Alternatively, the identity field 102 may be separate from the data field containing the true device identifier code of the testing device 110.

In 340, the target processor 130 may detect a resetting, in other words, restarting or rebooting, of the testing device 110. The target processor 130 may load new device firmware corresponding to the new identity of the testing device 110. The testing device 110 may be restarted to simulate plugging in a new peripheral device to the receptacle of the target processor 130. After the testing device 110 is restarted, the testing device 110 may load the new device identifier code that was written into its identity field 102 under the process 338. In 342, the target processor 130 may enumerate the testing device 110 according to its new identity, as if the testing device 110 is newly connected to the target processor 130. In other words, the target processor 130 may recognize the new identity of the testing device 110. In 344, a tester or the testing software 122 may determine if the new identity as recognized by the target processor 130 corresponds to the device emulation command. If the new identity is not correctly recognized by the target processor 130, the tester or the testing software 122 may proceed to sub-process 348, to unplug the testing device 110. The tester or the testing software 122 may then proceed to sub-process 350, to reset the identity field 102 of the testing device 110 and then connect the testing device 110 back to the receptacle of the target processor 130, thereby returning to sub-process 332. The testing device 110 may include a reset button which may be configured to reset the identity field 102 to the true identity of the testing device 110, in other words, load the default device identifier code into the identity field 102. If the new identity is recognized by the target processor 130, the device emulation process 300 may end at sub-process 346. The device emulation process 300 may be repeated from sub-process 338 to emulate more HIDs.

Figure 4:
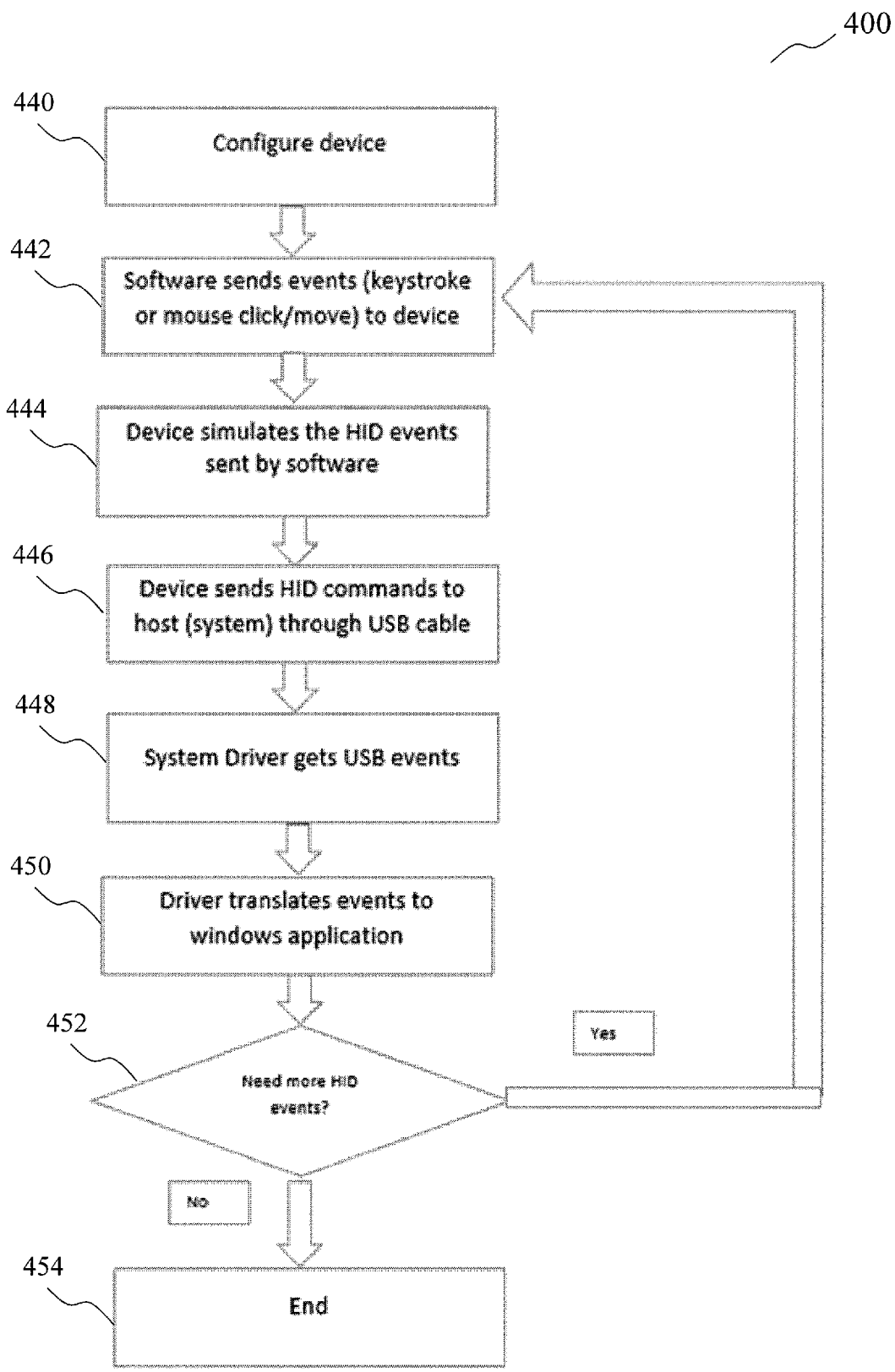
FIG. 4 shows a flow diagram of an event simulation process.

FIG. 4 shows a flow diagram of an event simulation process 400. The event simulation process 400 may be part of the method for testing a device driver software of a processor. In 440, the testing device 110 may be configured according to the device emulation process 300. In other words, the process 440 may include the entire device emulation process 300. The remaining processes may be performed after the device emulation process 300 has been completed. In 442, the testing software 122 may send input instructions to the testing device 110. The input instructions may be indicative of events, in other words, inputs that are performable on the HID. If the HID is a computer mouse, the inputs may include a left click, a right click or a rotation of the scroll wheel. In the example of a keyboard, the inputs may include depression of a key such as a spacebar or an "a" letter key, in other words a keystroke. The testing software 122 may also load an emulation program 108 into the testing device 110 based on the device emulation command. Alternatively, the testing device 110 may already store a plurality of emulation programs 108 and the testing software 122 may select one emulation program 108 from the plurality of emulation programs 108 based on the device emulation command. The loaded emulation program 108 or the selected emulation program 108 may correspond to the HID defined by the configured identity field 102. In 444, the testing device 110 may simulate the inputs based on the input instructions sent by the testing software 122. The testing software 122 may initiate the emulation program 108. Alternatively, the testing device 110 may run the emulation program 108 once the emulation program 108 is loaded or selected. The emulation program 108 may simulate the inputs based on the input instructions. The emulation program 108 may be configured to emulate an output signal of the HID in response to the inputs. The output signal may also be referred herein as a HID command. In 446, the testing device 110 may send the HID commands to the target processor 130 through the second device interface 106. In 448, the device driver software 132 on the target processor 130 may receive the output signal from the testing device 110. The device driver software 132 may also be referred herein as the system driver. In 450, the device driver software 132 may translate the output signal and thereby activate an event in an application running on the target processor 130 based on the simulated inputs. The application may be a windows application or may be an operating system. In 452, the tester or the testing software 122 may determine whether more HID events should be simulated. If yes, the process may revert to sub-process 442, where the testing software 122 sends another input instruction to the testing device 110. If no, the process may end at 454.

According to various embodiments, the testing device 110 may communicate with a computing device through standard protocols, for example USB protocols. The communication between the computing device and the testing device may be in the direction of host-to-device, in other words, the computing device may send commands to the testing device 110 but not vice-versa. The computing device may be any one of the control processor 120 or the target processor 130. The standard protocol may dictate that each command include three parts, namely identifier, length and payload. The identifier may be a package header that identifies the command. The payload may be contents directly relating to the instruction contained in the command. The length may indicate the length of the command. The computing device may send a set-USB-descriptor command to the testing device 110 for setting the USB descriptor. The payload of the set-USB-descriptor command may include a device descriptor, a configuration descriptor, an interface descriptor, a HID descriptor, an endpoint descriptor and a string descriptor. The device descriptor may include the device identifier code. The computing device may use the set-USB-descriptor command to send a standard USB descriptor byte array to the testing device 110. The computing device may send a set-report-descriptor command to the testing device 110 for setting the report descriptor. The report descriptor may specify the quantity of data to transfer to the computing device and how the data is to be interpreted. The payload of the set-report-descriptor command may follow the USB HID standard and may be customized by users. The computing device may use the set-report-descriptor command to send a customized HID report format byte array to the testing device 110. The HID report format byte array may be of a non-standard format. The HID report format byte array may be a rule agreed between the computing device, i.e. the host, and the testing device 110, i.e. the client. Each of the set-USB-descriptor command and the set-report-descriptor command may be sent under process 338. The computing device may send a reset-device command to the testing device 110 to reset the testing device 110, in other words, to restart the testing device 110, under process 340. The payload of the reset-device command may be empty. On receiving the reset-device command, the testing device 110 may restart and thereby launch the new device descriptor that was sent to the testing device 110 under the process 338. The computing device may send a device-event-simulation command to the testing device 110 to trigger the testing device 110 to simulate the HID events sent by the testing software 122. The device-event-simulation command may include an extra field to indicate an interface identity. The interface identity may contain information on the interface from which the testing device 110 will receive the simulation events. The payload of the device-event-simulation command may include a simulation of a HID such as a keyboard or a mouse. The control processor 120 may send the set-USB-descriptor command and the set-report-descriptor command to the testing device 110 to transfer the device identifier code 214 from the control processor 120 to the testing device 110, for example in process 338 of FIG. 3. The control processor 120 may send the reset-device command to the testing device 110 to, for example in process 340 of FIG. 3 after the new device identifier code is written to the identity field 102. The control processor 120 may send the device-event simulation command to the testing device 110, for example in process 442 of FIG. 4. The device-event simulation command may include input instructions.

Figure 5:
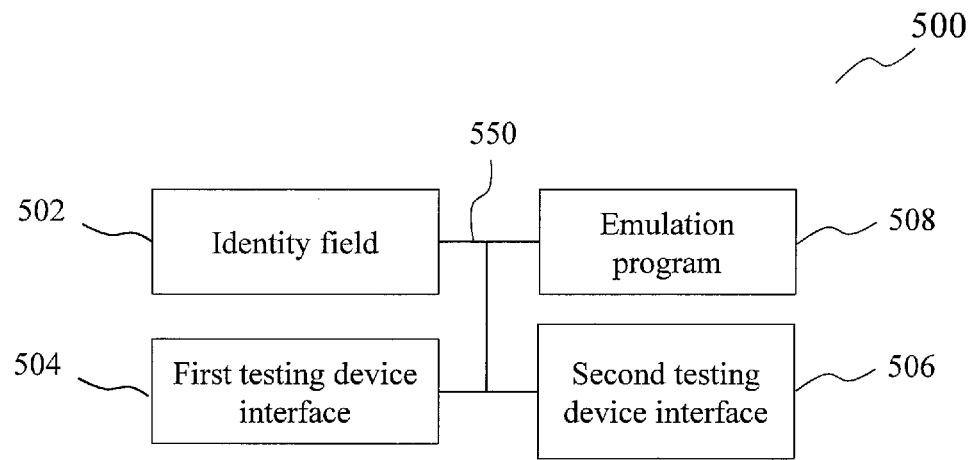
FIG. 5 shows a conceptual diagram of a testing device according to various embodiments.

FIG. 5 shows a conceptual diagram of a testing device 500 according to various embodiments. The testing device 500 may be identical to, or at least substantially similar to, the testing device 110. The testing device 500 may include an identity field 502, a first testing device interface 504, a second testing device interface 506 and an emulation program 508. The identity field 502 may be identical to, or at least substantially similar to, the identity field 102. The identity field 502 may be accessible by a device driver software of a processor for recognizing the testing device 500. The first testing device interface 504 may be identical to, or at least substantially similar to, the first device interface 104. The first testing device interface 504 may be configured to receive a device emulation command. The identity field 502 may be configurable based on the device emulation command. The emulation program 508 may be identical to, or at least substantially similar to, the emulation program 108. The emulation program 508 may include an emulation of a HID in accordance with the configured identity field 502. The emulation may be identical to, or at least substantially similar to, the emulation 216. The first testing device interface 504 may be further configured to receive an input instruction indicative of an input performable on the emulated HID. The emulation program 508 may be further configured to emulate an output signal generatable by the emulated HID in response to the input being performed on the emulated HID. The second testing device interface 506 may be identical to, or at least substantially similar to, the second device interface 106. The second testing device interface 506 may be configured to output the emulated output signal to the device driver software to translate the emulated output signal to an event in an application program running on the processor. The identity field 502, the first testing device interface 504, the second testing device interface 506 and the emulation program 508 may be coupled with each other, like indicated by lines 550, for example communicatively coupled or electrically coupled, for example using a line or a cable, and/or mechanically coupled.

In other words, the testing device 500 may be configured to test a device driver software. The device driver software may be running on a processor. The testing device 500 may include an identity field 502. The identity field 502 may be accessible to the device driver software. The device driver software may recognize the testing device 500 based on the identity field 502. The identity field 502 may be configurable. The testing device 500 may further include a first testing device interface 504 that may be configured to receive a device emulation command. The identity field 502 may be configured based on the device emulation command. The configured identity field 502 may indicate the testing device 500 as a HID, for example a particular model of HID. The testing device 500 may further include an emulation program 508. The emulation program 508 may include an emulation of the HID in accordance with the configured identity field 502. The HID corresponding to the configured identity field 502 may also be referred herein as the emulated HID. The emulated HID may be one of a keyboard, a mouse, a joystick or a game controller. The first testing device interface 504 may also be configured to receive an input instruction. The input instruction may indicate an input performable on the emulated HID. The emulation program 508 may be configured to emulate an output signal that the emulated HID would have generated in response to the input being performed on the emulated HID. In other words, the emulation program 508 may emulate the behaviour of the emulated HID in response to inputs being performed on the HID. The testing device 500 may further include a second testing device interface 506. The second testing device interface 506 may be configured to output the emulated output signal to the device driver software. At least one of the first testing device interface 504 or the second testing device interface 506 may be a USB interface.

The first testing device interface 504 may be the second testing device interface 506. In other words, the testing device 500 may include only a single testing device interface. The device driver software may translate the emulated output signal to an event in an application running on the processor.

Figure 6:
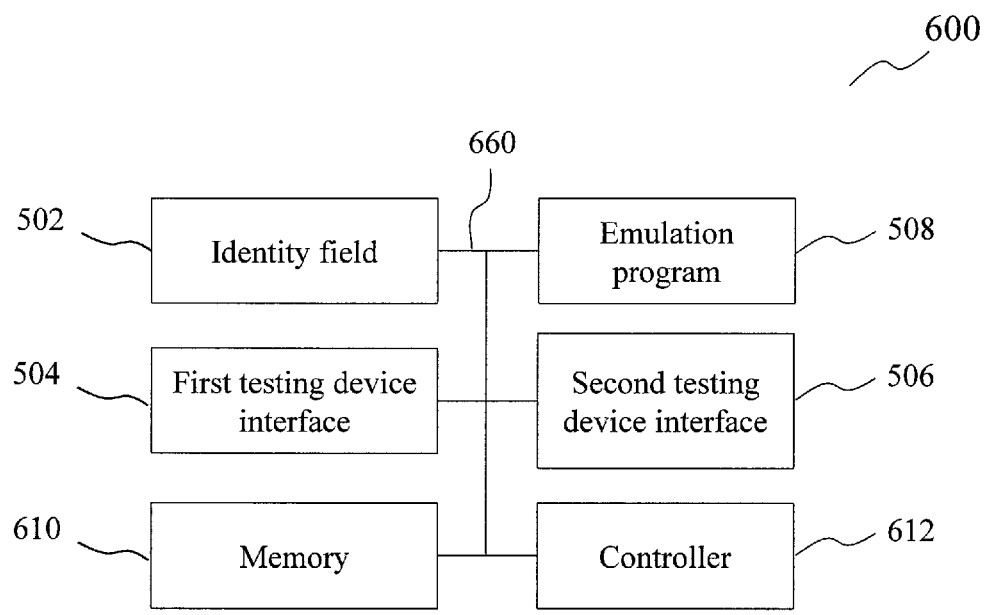
FIG. 6 shows a conceptual diagram of a testing device according to various embodiments.

FIG. 6 shows a conceptual diagram of a testing device 600 according to various embodiments. The testing device 600 may be similar to the testing device 500 in that it may also include an identity field 502, a first testing device interface 504, a second testing device interface 506 and an emulation program 508. In addition, the testing device 600 may further include a memory 610. The memory 610 may be configured to store a plurality of emulation programs 508. The testing device 600 may also include a controller 612. The controller 612 may be configured to identify the emulation program 508 corresponding to the configured identity field 502, from the plurality of emulation programs 508. In other words, the controller 612 may be configured to determine which emulation program 508 from the plurality of emulation programs 508 matches the configured identity field 502. The identity field 502, the first testing device interface 504, the second testing device interface 506, the emulation program 508, the memory 610 and the controller 612 may be coupled with each other, like indicated by lines 660, for example communicatively coupled or electrically coupled, for example using a line or a cable, and/or mechanically coupled.

Figure 7:
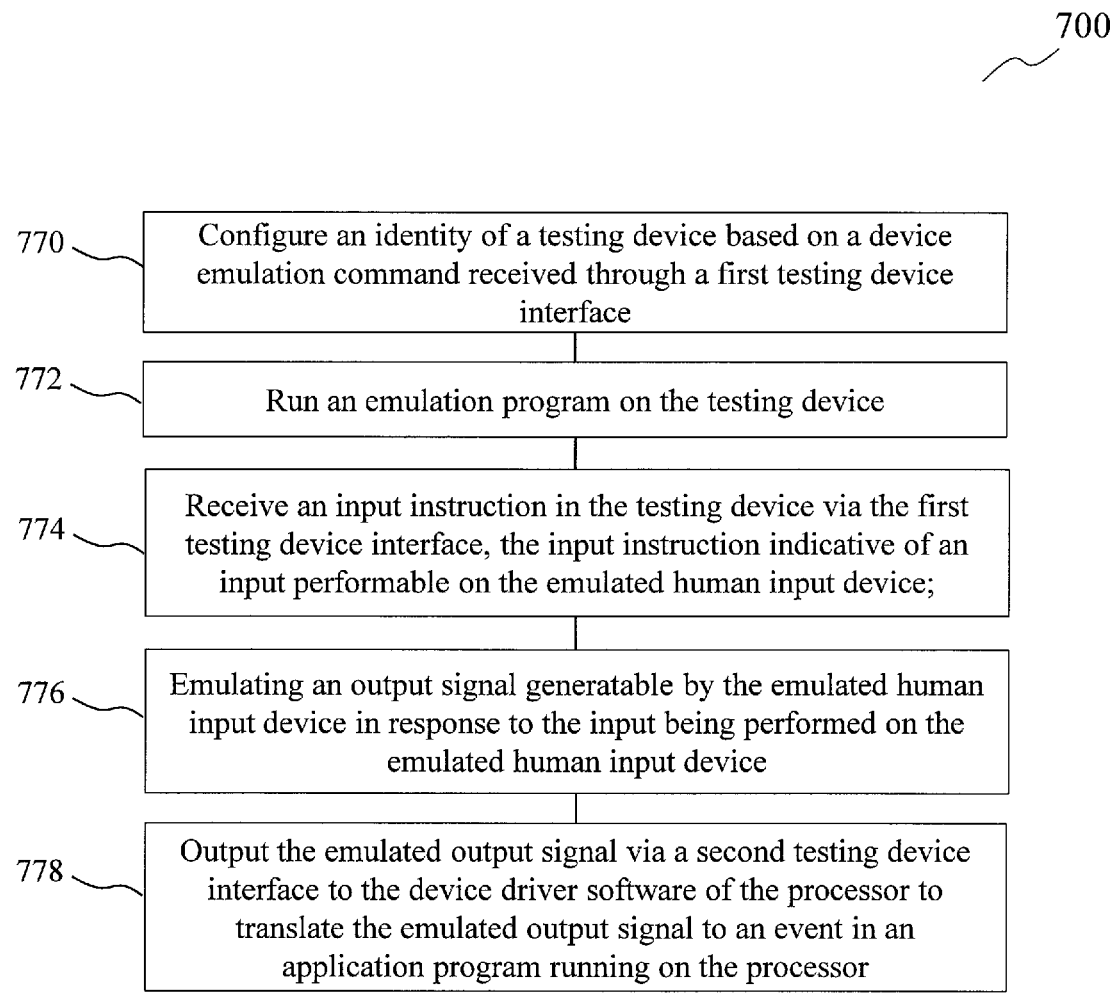
FIG. 7 shows a flow diagram of a method for testing a device driver software of a processor according to various embodiments.

FIG. 7 shows a flow diagram 700 of a method for testing a device driver software of a processor according to various embodiments. In 770, an identity of a testing device may be configured based on a device emulation command received through a first testing device interface. The device driver software may access the identity field for recognizing the testing device. The process of configuring the identity field may include one of writing a device identifier code into the identity field or selecting one device identifier code from a plurality of device identifier codes stored in the testing device. The device identifier code may include a product identifier and a vendor identifier. The device emulation command may include the device identifier code. In 772, the testing device may run an emulation program. The emulation program may include an emulation of a HID in accordance with the configured identity field. The process of running the emulation program may include at least one of loading the emulation program into the testing device or selecting one emulation program from a plurality of emulation programs stored on the testing device based on the device emulation command. In 774, an input instruction may be received in the testing device, via the first testing device interface. The input instruction may be indicative of an input performable on the emulated HID. In 776, an output signal may be emulated. The emulated HID may generate the output signal in response to the input being performed on the emulated HID. In 778, the emulated output signal may be output via a second testing device interface, to the device driver software of the processor, to translate the emulated output signal to an event in an application program. The processor may run the application program.

Figure 8:
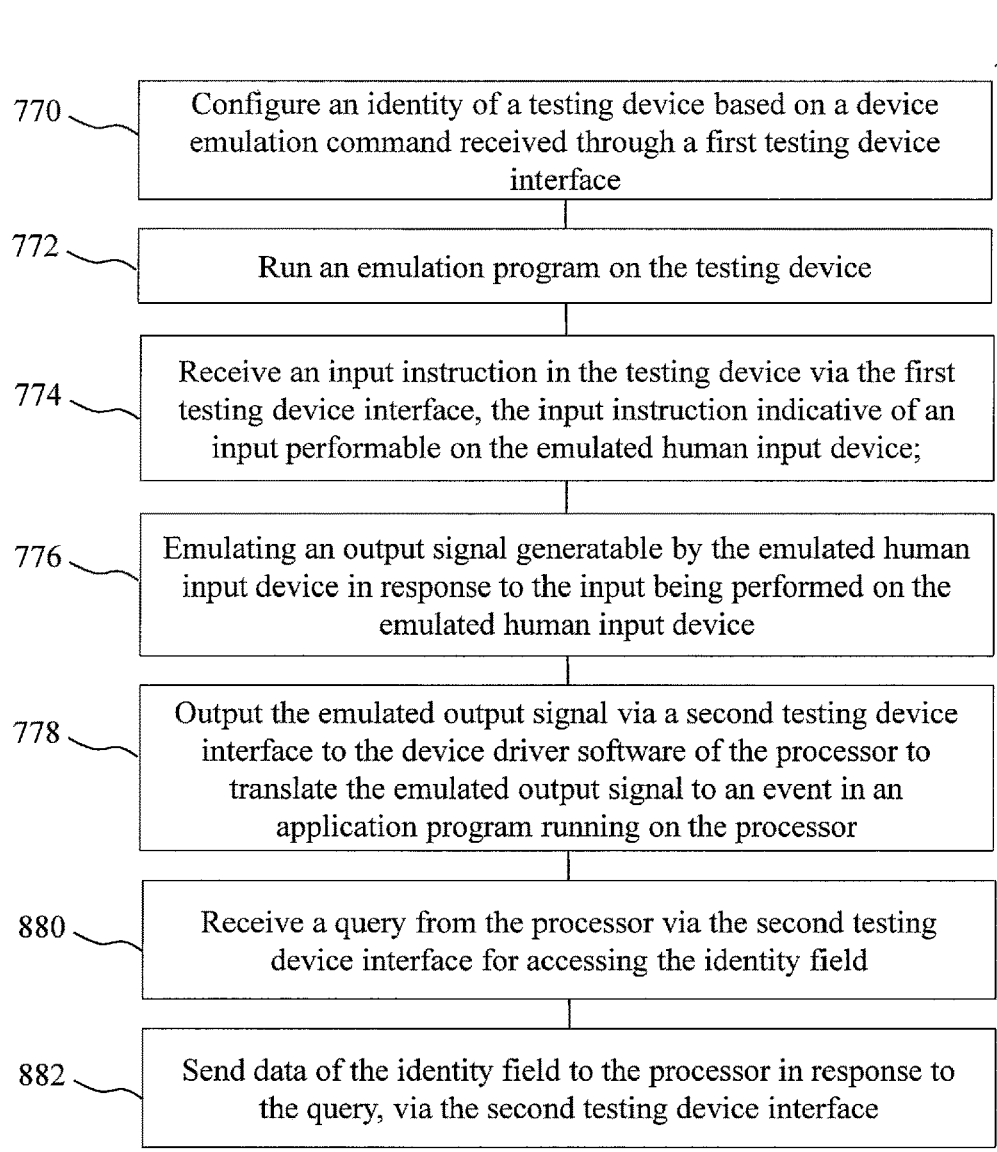
FIG. 8 shows a flow diagram of a method for testing a device driver software of a processor according to various embodiments.

FIG. 8 shows a flow diagram 800 of a method for testing a device driver software of a processor according to various embodiments. The method may be similar to the method shown in the flow diagram 700, but may further include 880, in which a query may be received by the processor via the second testing device interface for accessing the identity field. The method may further include 882, in which data of the identity field may be sent to the processor in response to the query, via the second testing device interface. The method may further include loading a firmware onto the processor. The firmware may be associated with the data in the configured identity field.

Figure 9:
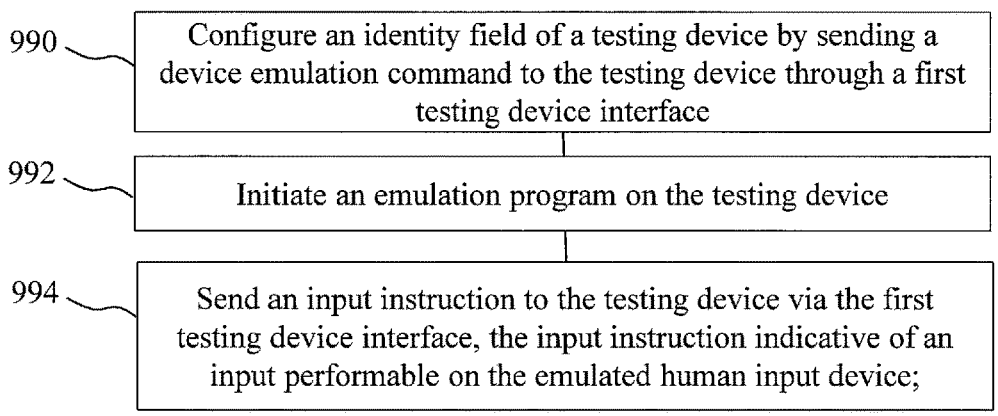
FIG. 9 shows a flow diagram of a method that may be performed by a processor when the processor executes instructions stored on a non-transient computer-readable medium.

FIG. 9 shows a flow diagram 900 of a method that may be performed by a processor when the processor executes instructions stored on a non-transient computer-readable medium. The method may include a plurality of processes. In 990, an identity field of a testing device may be configured by sending a device emulation command to the testing device through a first testing device interface. The device driver software may read the identity field for recognizing the testing device. In 992, an emulation program may be initiated on the testing device. The emulation program may include an emulation of a HID in accordance with the configured identity field. In 994, an input instruction may be sent to the testing device via the first testing device interface. The input instruction may indicate an input performable on the emulated HID. The emulation program may be configured to emulate an output signal generatable by the emulated HID in response to the input being performed on the emulated HID. The second testing device interface may be configured to output the emulated output signal to the device driver software of a further processor to translate the emulated output signal to an event in an application program. The further processor may run the application program.

According to various embodiments, the testing device 110 or 500 may be configured to simulate any user input on a HID, for example a key press on a keyboard or a right click on a computer. The testing device may be coupled to a computing device that is running an application. The testing software 122 may provide an input instruction to the testing device, and the testing device may simulate the user input based on the input instruction. The testing device may generate an output signal based on the simulated user input. The application on the computing device may receive an event based on the output signal, as if a user is providing the user input on the HID. The simulation of the user input may be performed by the emulation program in the HID. The simulation of the user input may be realistic and may bypass bot-detecting software and anti-virus software, as the output signal is received by the computing device from a physical hardware device, through a device interface. A user may use the testing software 122 to predefine user inputs.

The following examples pertain to further embodiments.

Example 1 is a method for testing a device driver software of a processor, the method including: configuring an identity field of a testing device based on a device emulation command received through a first testing device interface, wherein the identity field is accessible by the device driver software for recognising the testing device; running an emulation program on the testing device, the emulation program including an emulation of a human input device in accordance with the configured identity field; receiving an input instruction in the testing device via the first testing device interface, the input instruction indicative of an input performable on the emulated human input device; the emulation program, emulating an output signal generatable by the emulated human input device in response to the input being performed on the emulated human input device; outputting the emulated output signal via a second testing device interface to the device driver software of the processor to translate the emulated output signal to an event in an application program running on the processor.

In example 2, the subject-matter of example 1 can optionally include that the second testing device interface is the first testing device interface.

In example 3, the subject-matter of example 1 or example 2 can optionally include that configuring the identity field includes one of writing a device identifier code into the identity field or selecting one device identifier code from a plurality of device identifier codes stored in the testing device.

In example 4, the subject-matter of example 3 can optionally include that the device identifier code includes a product identifier and a vendor identifier.

In example 5, the subject-matter of example 3 or example 4 can optionally include that the device emulation command includes the device identifier code.

In example 6, the subject-matter of any one of examples 1 to 5 can optionally include that running the emulation program includes at least one of loading the emulation program into the testing device or selecting one emulation program from a plurality of emulation programs stored on the testing device based on the device emulation command.

In example 7, the subject-matter of any one of examples 1 to 6 can optionally include: receiving a query from the processor via the second testing device interface for accessing the identity field; and sending data of the identity field to the processor in response to the query, via the second testing device interface.

In example 8, the subject-matter of example 7 can optionally include: loading a firmware onto the processor, the firmware associated with the data in the configured identity field.

Example 9 is a testing device including: an identity field accessible by a device driver software of a processor for recognising the testing device; a first testing device interface configured to receive a device emulation command, wherein the identity field is configurable based on the device emulation command; an emulation program including an emulation of a human input device in accordance with the configured identity field; wherein the first testing device interface is further configured to receive an input instruction indicative of an input performable on the emulated human input device; wherein the emulation program is further configured to emulate an output signal generatable by the emulated human input device in response to the input being performed on the emulated human input device; a second testing device interface configured to output the emulated output signal to the device driver software to translate the emulated output signal to an event in an application program running on the processor.

In example 10, the subject-matter of example 9 can optionally include that at least one of the first testing device interface or the second testing device interface is a Universal Serial Bus interface.

In example 11, the subject-matter of example 9 or example 10 can optionally include that the emulated human input device is one of a keyboard, a mouse, a joystick or a game controller.

In example 12, the subject-matter of any one of examples 9 to 11 can optionally include: a memory configured to store a plurality of emulation programs; and a controller configured to identify the emulation program corresponding to the configured identity field, from the plurality of emulation programs.

Example 13 is a non-transient computer-readable medium having stored therein instructions which, when executed by a processor, causes the processor to perform a method for testing a device driver software, the method including: configuring an identity field of a testing device by sending a device emulation command to the testing device through a first testing device interface, the identity field being readable by the device driver software for recognising the testing device; initiating an emulation program on the testing device, the emulation program including an emulation of a human input device in accordance with the configured identity field; sending an input instruction to the testing device via the first testing device interface, the input instruction indicative of an input performable on the emulated human input device; wherein the emulation program is configured to emulate an output signal generatable by the emulated human input device in response to the input being performed on the emulated human input device; and wherein a second testing device interface is configured to output the emulated output signal to the device driver software of a further processor to translate the emulated output signal to an event in an application program running on the further processor.

While embodiments of the invention have been particularly shown, and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. A method for testing a device driver software of a processor, the method comprising:
   providing a testing device comprising a default device identifier code containing information on a true identity of the testing device written in an identity field of the testing device;
   configuring the identity field of the testing device based on a device emulation command received through a first testing device interface, wherein the identity field is accessible by the device driver software for recognising the testing device;
   loading onto the processor, a firmware corresponding to the testing device recognised, wherein the firmware is associated with data in the configured identity field;
   running an emulation program on the testing device, the emulation program comprising an emulation of a human input device in accordance with the configured identity field;
   receiving an input instruction in the testing device via the first testing device interface, the input instruction indicative of an input performable on the emulated human input device;
   the emulation program, emulating an output signal generatable by the emulated human input device in response to the input being performed on the emulated human input device;
   outputting the emulated output signal via a second testing device interface to the device driver software of the processor to translate the emulated output signal to an event in an application program running on the processor; and
   loading the default device identifier code into the identity field of the testing device by using a reset button comprised in the testing device.

2. The method of claim 1, wherein the second testing device interface is the first testing device interface.

3. The method of claim 1, wherein configuring the identity field comprises one of writing a device identifier code into the identity field or selecting one device identifier code from a plurality of device identifier codes stored in the testing device.

4. The method of claim 3, wherein the device identifier code comprises a product identifier and a vendor identifier.

5. The method of claim 3, wherein the device emulation command comprises the device identifier code.

6. The method of claim 1, wherein running the emulation program comprises at least one of loading the emulation program into the testing device or selecting one emulation program from a plurality of emulation programs stored on the testing device based on the device emulation command.

7. The method of claim 1, further comprising:
   receiving a query from the processor via the second testing device interface for accessing the identity field; and
   sending data of the identity field to the processor in response to the query, via the second testing device interface.

8. A testing device comprising:
   a default device identifier code containing information on a true identity of the testing device written in an identity field of the testing device;
   the identity field accessible by a device driver software of a processor for recognising the testing device, the processor configured to load a firmware corresponding to the testing device recognised, the firmware associated with data in the configured identity field;
   a first testing device interface configured to receive a device emulation command, wherein the identity field is configurable based on the device emulation command;
   an emulation program comprising an emulation of a human input device in accordance with the configured identity field;
   wherein the first testing device interface is further configured to receive an input instruction indicative of an input performable on the emulated human input device;
   wherein the emulation program is further configured to emulate an output signal generatable by the emulated human input device in response to the input being performed on the emulated human input device;
   a second testing device interface configured to output the emulated output signal to the device driver software to translate the emulated output signal to an event in an application program running on the processor; and
   a reset button configured to reset the identity field to the true identity of the testing device.

9. The testing device of claim 8, wherein at least one of the first testing device interface or the second testing device interface is a Universal Serial Bus interface.

10. The testing device of claim 8, wherein the emulated human input device is one of a keyboard, a mouse, a joystick or a game controller.

11. The testing device of claim 8, further comprising:
    a memory configured to store a plurality of emulation programs; and
    a controller configured to identify the emulation program corresponding to the configured identity field, from the plurality of emulation programs.

12. A non-transient computer-readable medium having stored therein instructions which, when executed by a processor, causes the processor to perform a method for testing a device driver software of the processor, the method comprising:
    providing a testing device comprising a default device identifier code containing information on a true identity of the testing device written in an identity field of the testing device;
    configuring the identity field of the testing device by sending a device emulation command to the testing device through a first testing device interface, the identity field being readable by the device driver software for recognising the testing device;
    loading onto the processor, a firmware corresponding to the testing device recognised, wherein the firmware is associated with data in the configured identity field;
    initiating an emulation program on the testing device, the emulation program comprising an emulation of a human input device in accordance with the configured identity field; sending an input instruction to the testing device via the first testing device interface, the input instruction indicative of an input performable on the emulated human input device; and loading the default device identifier code into the identity field of the testing device by using a reset button comprised in the testing device;

wherein the emulation program is configured to emulate an output signal generatable by the emulated human input device in response to the input being performed on the emulated human input device; and wherein a second testing device interface is configured to output the emulated output signal to the device driver software of a further processor to translate the emulated output signal to an event in an application program running on the further processor.

* * * * *